United States Patent [19]

Belanger

[11] Patent Number: 4,530,126
[45] Date of Patent: Jul. 23, 1985

[54] CAR WASHING APPARATUS
[75] Inventor: James A. Belanger, Northville, Mich.
[73] Assignee: Belanger, Inc., Northville, Mich.
[21] Appl. No.: 567,990
[22] Filed: Jan. 4, 1984
[51] Int. Cl.$^3$ .............................................. B60S 3/06
[52] U.S. Cl. ................................ 15/97 B; 15/53 AB; 15/DIG. 2
[58] Field of Search ............ 15/53 A, 53 AB, DIG. 2, 15/97 B

[56] References Cited

U.S. PATENT DOCUMENTS

| | | | |
|---|---|---|---|
| 3,350,733 | 11/1967 | Hanna | 15/53 AB |
| 3,688,328 | 9/1972 | Wilkins | 15/53 AB |
| 3,774,259 | 11/1973 | Genaro | 15/97 B |

FOREIGN PATENT DOCUMENTS

| | | | |
|---|---|---|---|
| 1580082 | 5/1970 | Fed. Rep. of Germany | 15/DIG. 2 |
| 2256897 | 11/1973 | Fed. Rep. of Germany | 15/DIG. 2 |
| 0870222 | 10/1981 | U.S.S.R. | 15/DIG. 2 |

*Primary Examiner*—Edward L. Roberts
*Attorney, Agent, or Firm*—Cullen, Sloman, Cantor, Grauer, Scott & Rutherford

[57] ABSTRACT

In a car wash apparatus for automatically scrubbing, washing and polishing the sides, rocker panels and wheels of a vehicle during movement along a predetermined path upon a floor, there is provided a pair of laterally spaced free standing longitudinally staggered scrubbing side wheel assemblies. Each assembly includes a base plate upon the floor and mounting an upright side frame. Parallel spaced first and second side wheel arms at their one ends are pivotally mounted upon the frame and extend forwardly at an acute angle toward the path of movement. Each arm at its free end mounts a bearing housing which supports the hydraulic motor whose drive shaft is journaled through the bearing housing and mounts upon a vertical axis, a scrubbing, washing and polishing wheel of cloth material. The side arms are interconnected for movement in unison. A pneumatic-hydraulic circuit is provided including an actuating cylinder located between the frame and the side wheel arm of one of the side wheel assemblies for moving the wheel arms and connected scrubbing wheels relative to the predetermined path and to the vehicle. A normally open three-way valve is located in a branch conduit of the circuit for delivering air to a pilot operated check valve located in the hydraulic conduit connecting the rod end of the cylinder to the corresponding air over oil reservoir.

16 Claims, 6 Drawing Figures

FIG. 2

CAR WASHING APPARATUS

BACKGROUND OF THE INVENTION

It is well known to provide a car washing apparatus for successively scrubbing and washing the front, sides and rear of a vehicle during movement along a predetermined path in a bay having a floor wherein a pair of laterally spaced longitudinally staggered wrap around scrubbing wheels are mounted upon opposite sides of the path upon a framework. In such an apparatus there have been provided oppositely arranged pairs of side scrubbing wheel assemblies for scrubbing, washing and polishing the sides, rocker panels and wheels of the vehicle. With such a construction the side scrubbing wheel assemblies have been supportably mounted upon the framework for the entire washing apparatus. These side wheel assemblies normally have been arranged longitudinally of the longitudinally staggered wrap around scrubbing wheels. This arrangement of the wrap around scrubbing wheels and the integral side scrubbing wheel assemblies longitudinally spaced out and upon a unit framework requires excessive floor space and considerable length as to the area of the bay through which the vehicle passes.

The Prior Art

Car washing apparatuses of this type are used in a cloth car wash system which include one or more apparatuses as shown in the following U.S. patents owned by the assignee of record: U.S. Pat. No. 4,057,866, issued Nov. 15, 1977, entitled "Apparatus for Washing and Drying Motor Vehicles"; U.S. Pat. No. 4,096,600, issued June 27, 1978, entitled "Friction Curtain Apparatus"; and No. 4,369,541, issued Jan. 25, 1983, entitled "Retractable Wax, Buff and Polish Apparatus for Cars". Construction of fabric scrubbing, washing and polishing wheels used in the side wheel assemblies is disclosed in U.S. Pat. Nos. 4,018,014 and 4,055,028, also owned by the assignee of this application.

Related Patent Application

Applicant's copending patent application entitled "Car Washing Apparatus", Ser. No. 383,925 was filed on June 2, 1982 now U.S. Pat. No. 4,424,602, and is directed to a car washing apparatus which includes laterally opposed pairs of longitudinally staggered wrap around scrubbing wheels mounted upon opposite sides of the vehicle path outwardly of the vehicle body.

SUMMARY OF THE INVENTION

An important feature of the present invention is to provide in such car washing apparatus a pair of laterally spaced free standing longitudinally staggered scrubbing side wheel assemblies for scrubbing, washing and polishing the sides, rocker panels and wheels of a vehicle during continuous movement through the washing apparatus.

Another feature is to provide laterally opposed pairs of free standing longitudinally staggered scrubbing side wheel assemblies which include an upright side frame having a base plate which may be selectively mounted in conjunction with the car washing apparatus independent of its framework so as to be free standing and at the same time longitudinally staggered upon opposite sides of the washing apparatus, to conserve space to render the car washing apparatus more compact and for a reduction of the total overall length of the car washing apparatus.

A further feature includes the use of the opposed pairs of laterally spaced longitudinally staggered free standing side wheel assemblies which are normally laterally spaced from the corresponding longitudinally staggered wrap around scrubbing wheels of the washing apparatus to provide a more efficient and more compact assembly and wherein during overall washing of the vehicle including the front, sides and rear thereof, the corresponding free standing side wheel assemblies are adapted for substantially simultaneous scrubbing, washing and polishing of the vehicle sides, particularly below the windows, the rocker panel and the wheels.

A further feature includes for each free standing scrubbing side wheel assembly, a base plate which may be selectively mounted upon the floor of the washing apparatus and which includes an upright side frame upon the base plate upon which are mounted first and second parallel spaced horizontal side arms at their one ends pivotally mounted the side frame and which extend forwardly at an acute angle to the path of vehicle movement.

Another feature includes mounted upon the free ends of the side arms, corresponding first and second bearing housings which support first and second hydraulic motors whose drive shafts, respectively are journaled through the bearing housings and individually support first and second scrubbing, washing and polishing wheels of fabric material mounted for rotation upon vertical axes.

A further feature includes for each of the opposed pairs of free standing longitudinally staggered scrubbing side wheel assemblies, a cylinder pivotally mounted upon the side frame including a reciprocal piston rod at one end pivotally connected to one of the horizontal side wheel arms and including a hydraulic-pneumatic circuit by which the side arms are normally biased outwardly for contacting and scrubbing the sides of the vehicle. The hydraulic-pneumatic circuit includes a pilot operated check valve for locking the arms so as not to do damage to the vehicle.

A further feature includes in conjunction with the laterally spaced pair of first and second horizontal side wheel arms a coupling between the arms so that the arms move in unison between operative positions.

These and other features and objects will be seen from the following Specification and claims in conjunction with the appended drawings.

It will be understood that the above drawings illustrate merely a preferred embodiment of the invention and that other embodiments are contemplated within the scope of the claims hereinafter set forth.

DETAILED DESCRIPTION OF PREFERRED EMBODIMENT OF THE INVENTION

Figures 1, 4:
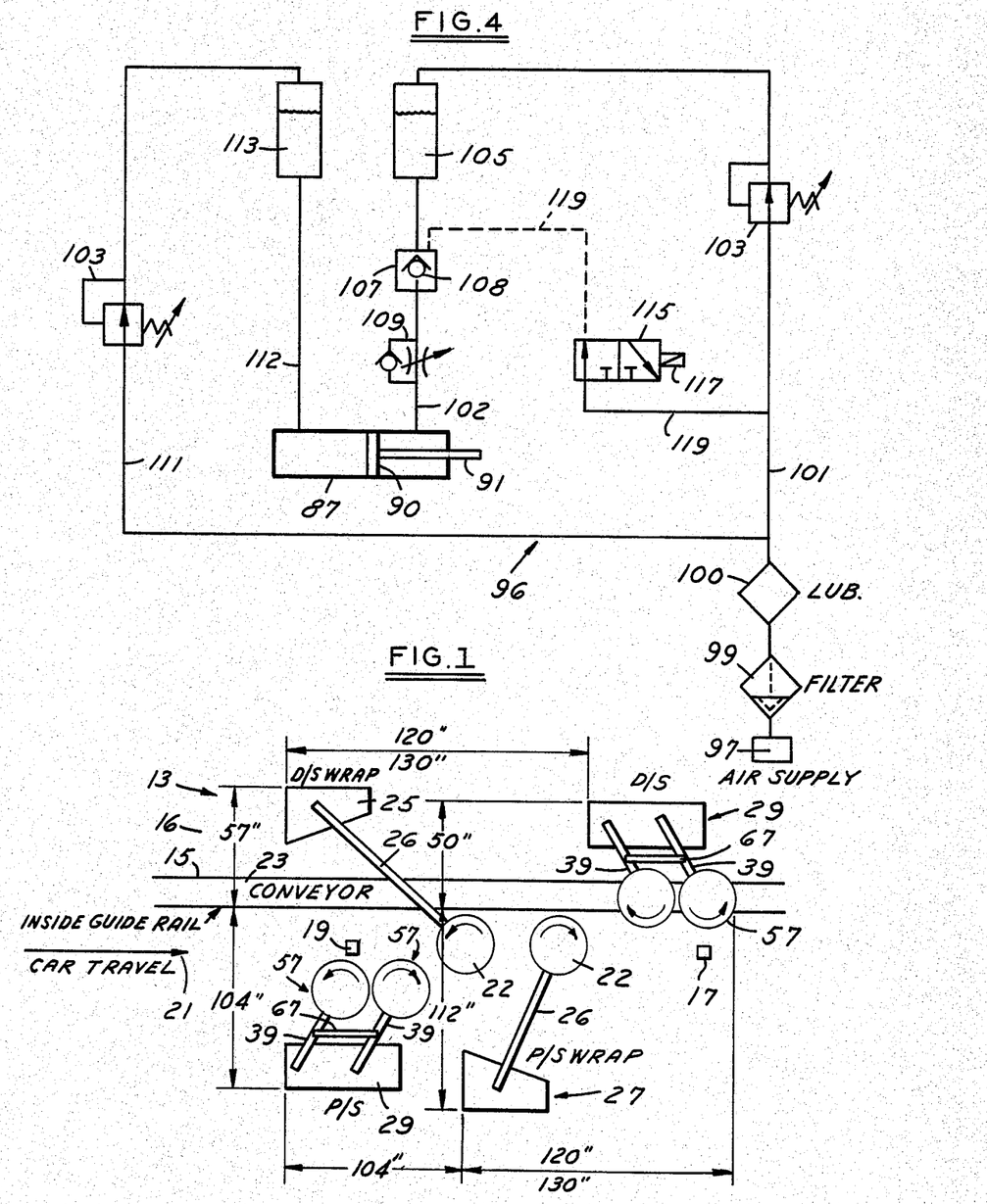
FIG. 1 is a schematic view of the improved car wash apparatus, illustrating the relationship between the wrap around scrubbing wheels and the spaced free standing side wheel assemblies.
FIG. 4 is a schematic diagram of the hydraulic-pneumatic circuit for the control cylinder for the side wheel arms for the scrubbing, washing and polishing fabric side wheel assemblies.

Free standing longitudially staggered scrubbing wheel assemblies are shown in FIG. 1, as part of an overall car wash apparatus 13 for successively scrubbing the front, sides and rear of a vehicle body during movement thereof along a predetermined path in a bay. As schematically shown, there is provided a conventional channel type of wheel guide 15 which extends along the direction of vehicle travel mounted upon a floor 16 forming a part of a bay or wash area.

The boxes 17 and 19 of FIG. 1 schematically show corresponding front and rear ends of a single vehicle to travel through the bay, or alternately a pair of longitudinally spaced vehicles to which the car wash apparatus is applied in a continuous manner. The center line of vehicle travel is designated by the arrow 21, FIG. 1.

A suitable conveyor 23 is schematically designated, located within the guide rail 15, such as shown in the Assignee's copending patent application, Ser. No. 498,254, filed May 26, 1983, directed to an automobile conveyor.

There is designated at 25 and 27 power driven longitudinally staggered wrap around scrubbing wheel assemblies further disclosed in the copending application, Ser. No. 383,925. Each of the corresponding wrap around scrubbing wheels 22 is suspended from a carriage 24 movably mounted upon an elongated arm or boom 26, with the boom 26 swingable in a horizontal plane between a first position inclined transversely with respect to the path of movement of the vehicle and a second position which is substantially parallel with the aforesaid path. The carriage 24 is movable from one end of the boom 26 towards the other end portion thereof. The boom 26 is mounted for pivotal movement upon a vertical axis so as to maintain the boom 26 at all times in a single horizontal plane while movable between the first and second positions to engage along front portions of the vehicle, side portions and rear portions of the vehicle in the manner and by the structure disclosed in the said copending application and as illustrated in FIGS. 1 and 2.

Accordingly a more detailed description is omitted herein, except to note that the corresponding wrap around cloth scrubbing wheel assemblies 25 and 27 are longitudinally staggered as fully disclosed in said copending application.

Figure 2:
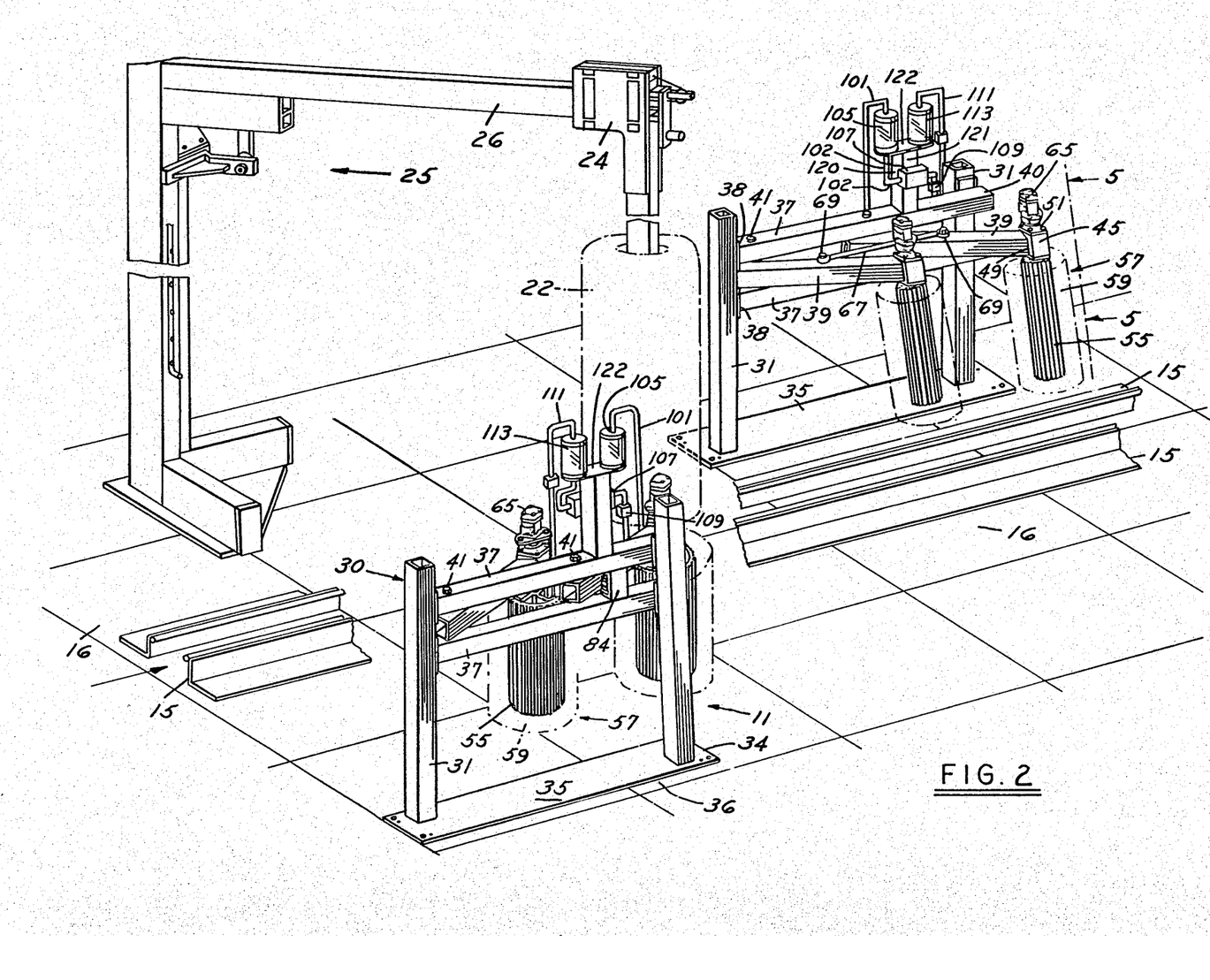
FIG. 2 is a side perspective view on an enlarged scale of one of the longitudinally staggered wrap around scrubbing wheel assemblies and the opposed pairs of spaced free standing side wheel assemblies, shown in FIGS. 1 and 2 as longitudinally staggered.

The individual free standing side wheel arm assemblies 29, as shown in FIG. 2, are longitudinally staggered with respect to each other for consolidation of the work area and for utilizing available space adjacent the corresponding wrap around scrubbing wheel assemblies 25, 27, of FIGS. 1 and 2. Each of the free standing scrubbing side wheel assemblies 29 includes a longitudinally extending side frame 30 including a pair of vertical posts 31 which at their lower ends are connected, as an example, by welding to the horizontal base plate 35. Each base plate 35 is adapted for selective positioning upon floor surface 16, FIG. 2, longitudinally staggered with respect to each other. In the illustrative embodiment of FIG. 1, the free standing side wheel assemblies 29 are opposed to the corresponding wrap around scrubbing wheel assemblies 25, 27. The free standing assemblies 25, 27 and 29 are usually bolted or fastened to the floor surface 16.

Each of the side frames 30 includes a pair of vertically spaced top beams 37 suitably secured to the standards or posts 31 by welding or suitable fasteners.

Figures 3, 3A:
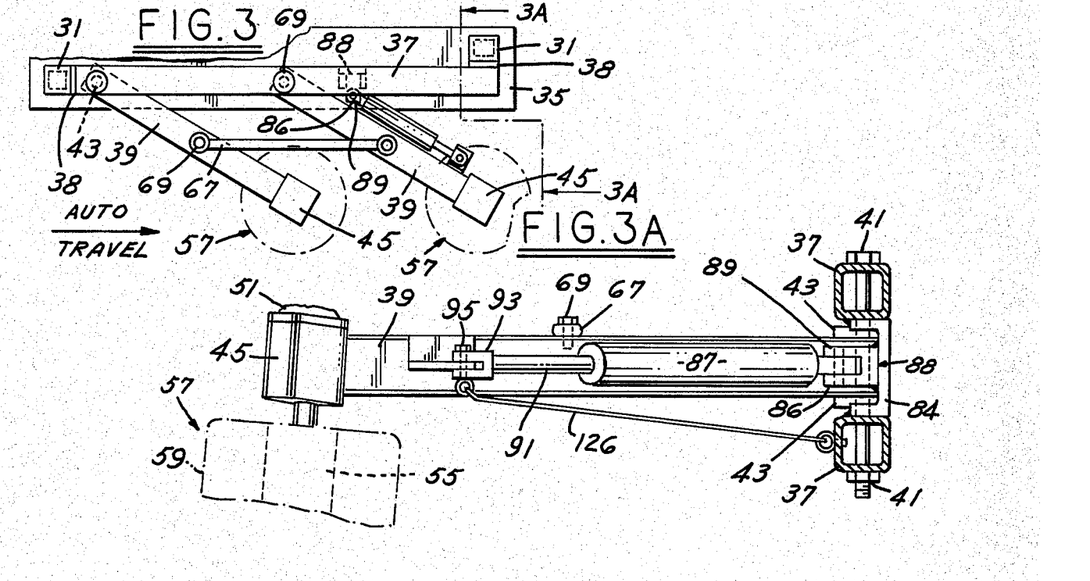
FIG. 3 is a fragmentary plan view, with parts removed and parts broken away, of the free standing side wheel assembly located on the driver side of the apparatus.
FIG. 3A is a fragmentary side view, partly in section, taken on the line 3A—3A of FIG. 3, on an enlarged scale with respect to FIG. 3, and illustrating the actuating cylinder mounted between the frame and side wheel arm.

The side wheel arm 39, at one extends between the top beams 37 and is pivotally mounted thereon by the pivot bolt 41. The bolt 41 extends between the respective beams 37 and is secured thereto by corresponding lock nuts. Suitable bearings 43 are located on opposite sides of the side wheel arm 39 between the top beams 37 and through which the bolt 41 extends as shown in FIG. 3.

A bearing housing 45 is secured upon the outer end of the side wheel arm 39 as by welding at 49 upon an axis 47 having a compound angle in two directions, as an example, 5 degrees, approximately. Bearings 51 on opposite ends of bearing housing 45 receive the drive shaft 53 upon the axis 47 which is generally vertical. Mounted upon the depending end of shaft 53 is the grooved hub 55, FIG. 2, sometimes referred to as a cylindrical body or hub, preferably constructed of aluminum. The hub 55 has around its periphery a series of elongated laterally spaced slots in a construction such as shown in U.S. Pat. Nos. 4,018,014 and 4,055,028.

Side wheel scrubbing, washing and polishing wheel assembly 57 includes a series of cloth flaps or sections 59 which have enlarged beaded edges removably secured within the corresponding slotted portions of the cylindrical hub 55. Flaps 59 are removable as required for replacement.

Torque plate 61 is supported upon a plurality of torque bars 63 on bearing housing 45 and mounts the hydraulic motor 65 with the aforesaid drive shaft 53 upon axis 47. The motor 65 is adapted for supporting and rotating the side wheel scrubbing assembly 57 in one direction.

As shown in FIGS. 1 and 2, there is provided a second horizontal side wheel arm 39 which is mounted on the frame 30 of each assembly or unit 29 parallel to and laterally spaced from the first side wheel arm 39. The second arm 39 at one end is similarly pivotally mounted upon intermediate portions of the top beams 37 by a corresponding pivot bolt 41.

The frame 30 of each side wheel arm scrubbing assembly 29 has the vertical posts 31 located at opposite end portions 34 of the plate 35 along opposing longitudinal edges 36 of the plate. Thus the posts 31 are located on opposite sides of the longitudinal centerline, not shown, of plate 35. Due to this offset relationship, each horizontal top beam 37, at one end, is connected to one vertical post 31 through an end plate 38. The end plate 38, as an example, is welded to the end surface of the top beam 37 which is, in turn, welded or fastened by bolts or other means to the vertical post 31.

The other end of each top beam 37 has the end portion 40 rather than the end face or surface thereof abutting and welded directly to the opposite side surface of the adjacent vertical post 31. The posts 31 and top beams 37 are each of tubular construction and have a generally square or rectangular cross-section. The frame 30 including the plate 35, posts 31 and beams 37 are made from aluminum.

The side wheel arms 39 are interconnected by the tie rod 67. The tie rod 67 has opposing ends pivotally mounted to the arms 39 intermediate the ends thereof by pivot bolts 69 as shown in FIG. 2. Thus movement of one side wheel arm 39 and the connected first scrubbing wheel assembly 57 moves the second side wheel arm 39 and the second wheel assembly 57 through means of the tie rod 67.

The frame 30 has an upstanding channel shape support element 84 of limited width (as shown in FIG. 2) inserted in a part of the space between the two top beams 37 and welded or otherwise secured therebetween as shown in FIG. 3A. A clevis 86 is welded to the vertical wall 88 of the channel element 84. Pivotally mounted upon the clevis 86 of each of the free standing scrubbing side wheel assemblies 29, FIGS. 3 and 3A, is a control cylinder assembly 87. The assembly 87 is pivotally mounted to the clevis 86 by pivot pin 89. The cylinder assembly 87 includes a reciprocal piston 90 and piston rod 91 which projects from the cylinder 87 and at its free end mounts a clevis 93 pivotally connected by pivot pin 95 to a portion of the first side wheel arm 39. The control cylinder assembly 87 is included within the hydraulic-pneumatic circuit or diagram 96, FIG. 4.

The hydraulic-pneumatic circuit 96 includes an air supply 97, at a predetermined and selected air pressure. The air is directed through the filter 99 and through the lubricator 100 for providing lubrication to the valves within the circuit 96. Pressurized air is delivered from source 97 through conduit 101 and through the self relieving adjustable pressure regulator 103 to one end of the hydraulic or oil reservoir 105 containing oil. Conduit 101 is sometimes referred to as a third conduit and the reservoir 105 is referred to as the first reservoir.

Additional conduit 111 sometimes referred to as a fourth conduit, extends from conduit 101 adjacent lubricator 100 and includes the self relieving adjustable pressure regulator 103 for delivering pressurized air to one end of the second oil reservoir 113 normally filled with oil. A conduit 102, sometimes referred to as a first conduit, interconnects the first reservoir 105 and the one end or rod end of the cylinder 87. Conduit 112 interconnects the second oil reservoir 113 and the other end or piston end of the cylinder 87 and is sometimes referred to as a second conduit.

As shown in FIG. 4, within the first conduit 102 leading to the cylinder assembly 87 there is provided a pilot operated check valve 107 from which fluids pass through the flow control valve 109 into the rod end of the cylinder assembly 87. The flow control valve 109 is adjustable and is adapted for controlling and limiting the flow of fluids from the rod end of cylinder assembly 87. This is provided to slow down the extension of the piston rod 91 within the cylinder assembly 87. Thus after a vehicle leaves the bay and the corresponding free standing scrubbing side wheel assemblies 29, the flow of fluids through the conduit 102 is reduced so that the side scrubbing wheels 57 extend at a slow rate providing a limited time delay for extension of the side wheel assemblies.

Branch conduit 119 interconnects the third conduit 101 and the check valve 107. Interposed within the conduit 119 is the normally open three-way control valve or air limit switch 115 which may employ a pilot control or a solenoid 117 whereby pressurized air flows through the branch conduit 119, across control valve 115, into the check valve 107 to hold the checking mechanism or ball valve 108 off its seat to thereby permit flow of hydraulic fluid in both directions in conduit 102 between the first reservoir 105 and the cylinder assembly 87.

As mentioned previously, by employing the flow control valve 109 within the first conduit 102 leading to the rod end of the cylinder assembly 87, there is provided a means for slowing down the flow of fluids from the rod end of the cylinder assembly 87. This produces a time delay so that the extension of the piston rod 91 and the connected side scrubbing wheels 57 is slowed down after the vehicle has passed the last of the free standing side wheel scrubbing assemblies 29, FIG. 1. A suitable limit switch or limit switch wand may be provided in the bay as to contact the vehicle or which may be released upon movement of the vehicle away from the wand such that the pilot control 117 is energized to operate the control valve 115 thereby reversing its air connections. As a result thereof, auxiliary pressure air through branch 119 is cut-off from the cylinder assembly 87.

Figure 5:
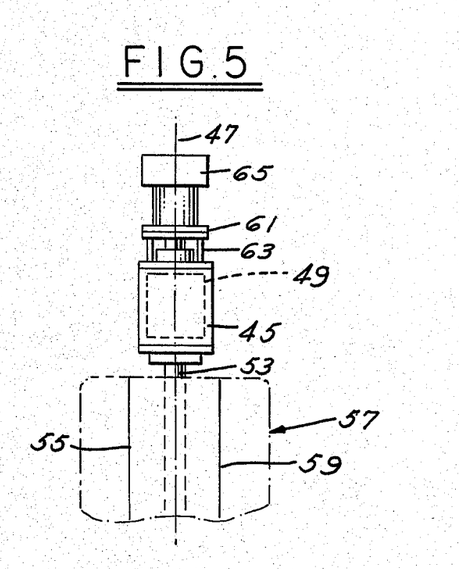
FIG. 5 is a fragmentary view of one of the side wheel arms and connected scrubbing wheel taken on line 5—5 of FIG. 2.

The construction of the second side wheel arm 39, FIG. 2, is the same as the first described side arm except that the hydraulic motor 65 mounted upon the free end thereof is adapted for driving the shaft 53 and the attached side scrubbing wheel 57 in a direction opposite from the direction of rotation of the first described hydraulic motor 65, FIG. 5.

There is provided in a tandem relationship, a pair of longitudinally spaced first and second scrubbing, washing and polishing wheels 57 which are adapted to rotate in opposite directions for operative engagement with side portions of the vehicle and particularly the wheels, the rocker panels and portions of the vehicle body below the windows.

The present longitudinally staggered free standing side wheel car wash assemblies 29, FIGS. 1 and 2, are particularly adapted for operative engagement with the entire areas of the vehicle below the car windows. With two scrubbing, washing and polishing wheels on each side, moving in tandem and rotating in opposite directions, thorough cleaning of the car body and wheels is accomplished.

The longitudinally staggered free standing scrubbing wheel assemblies 29 are so constructed that the corresponding scrubbing wheels, of a fabric material, open out by centrifugal force during rotation, in FIG. 1, to substantially conform to the shape of the compact or full size vehicles, with the wheels 57 firmly scrubbing, washing and gently polishing.

Each side wheel assembly 29 has a vertical tubular mounting element 120, also made from aluminum, extending upwardly from the upper top beam 37. The mounting element 120 has one end abutting and secured to the beam 37, as an example, by welding. The upper end of the mounting element 120 is provided with a plate 122 upon which are mounted the first and second hydraulic reservoirs 105 and 113. The pilot operated check valve 107 is secured to a vertical wall 121 of mounting element 120. The first conduit 102 extends from the first reservoir 105 through the check valve 107 and flow control 109 to the rod end of the cylinder assembly 87. The second reservoir 113 is connected to the piston end of cylinder 87 by the second conduit 112. The third conduit 101 and the fourth conduit 111 connect the air supply 97 under pressure to the upper ends of the first and second reservoirs 105 and 113 respectively to provide pressurized air over the oil or hydraulic fluid in the reservoirs 105 and 113.

The branch conduit 119 is connected to the air supply 97 via conduit 101, as illustrated, or may be connected to conduit 111 or directly to the air supply 97. Located in the branch conduit 119 is the normally open three-way valve 115 for delivering a pilot air signal to the pilot operated check valve 107. Pressure regulators 103 are located in the third conduit 101 and also in the fourth conduit 111, each regulator being located between the air supply 97 and the corresponding reservoir 105, 113. The regulator 103 located in the fourth conduit 111 is set at a higher pressure setting than the regulator 103 located in the third conduit 101. The regulator 103 in the third conduit 103 is set, as an example, at 15 psi, while the regulator 103 in the fourth conduit 111 is set, as an example, in the pressure range between 30 to 50 psi. The difference in the pressure of air between the first and second reservoirs 105, 113 is effective to direct the oil from the second reservoir 113 into the cylinder or piston end of the cylinder assembly 87 and to thereby extend the piston rod 91 resulting in the side wheel arm 37 and the connected first scrubbing wheel 57 being extended towards the path 21. At the same time tie rod 67 extends the second side wheel arm 37 and the connected second scrubbing wheel 57.

At such time, with the three-way valve 115 in an open position, the pilot operated check valve 107 is held open by the pressure of air in the branch conduit 119 and the side wheel arms 37 and the first and second scrubbing wheels 57 are extended towards the path 21. When the side scrubbing wheels 57 are contacted by the vehicle body, the force of the wheels 57 is effective to overcome the force exerted by the cylinder assembly 87 thereby moving the side wheel arms 37 and the pair of connected scrubbing wheels 57 away from path 21 to compensate for vehicle bodies of different width. The side wheel arms and connected scrubbing wheels 57 apply pressure to the side of the vehicle body as the vehicle moves forwardly along path 21.

The three-way valve 115 is shifted when the vehicle body starts to exit from the side wheel arms 37 and connected scrubbing wheels 57 thereby blocking flow of air therethrough. As a result thereof the pilot air signal on the check valve 107 is released. Upon release of the air under pressure from check valve 107 and when the scrubbing wheels 57 are contacted by the vehicle body, the hydraulic fluid or oil in the first conduit 102 is permitted to flow in one direction only from the first reservoir 105 to the rod end of the cylinder assembly 87 whereby the side wheel arms 39 and connected scrubbing wheels 59 are adapted to move away from the path 21 and from the vehicle body. Such an arrangement prevents the scrubbing wheels 57 from moving into a wheel well of the vehicle or being sucked into a well, thereby damaging the vehicle body or the equipment.

When the check valve 107 closes the hydraulic fluid or oil in the rod end of cylinder assembly 87 is prevented from exiting the cylinder. When check valve 107 is opened, hydraulic fluid can move across check valve 107 between reservoir 105 and the rod end of the cylinder 87.

The three-way valve 115 after the vehicle body completely exits from the scrubbing wheels 57 is shifted to its normally open position resulting in air under pressure being directed to the pilot operated check valve 107 which unseats the ball check or checking mechanism 108 therein and permits oil flow in both directions in the first conduit 102. As a result thereof, the side wheel arms 39 and connected scrubbing wheels 57 are extended towards the next vehicle body and the path 21 as a result of the difference in pressure of air in conduits 101 and 111 as determined by the settings of the pressure regulator 103.

As indicated previously, the flow control valve 109 located in conduit 102 between the check valve 107 and the rod end of cylinder 87 provides restricted flow of oil out of the cylinder 87 so that extension of the scrubbing wheels 57 is at a reduced rate after the vehicle has passed the scrubbing wheels so as not to damage or dent the next vehicle body.

The three-way directional valve 115 may be operated manually or semi-automatically upon the vehicle body tripping a wand placed along the path of travel. Electronic means such as a remote controlled solenoid 117 may be utilized to activate the normally open three-way valve 115.

As shown in FIG. 3, a cable stop 126 is provided which has one end connected to the eye pivot bolt 95 located on the outer end of the piston rod 91 and has the other end connected, as an example, to the lower top beam 37 as shown in FIG. 3A. The cable stop 126 limits the extension and travel of the side wheel arms 39 and the cylinder assembly 87 to prevent the piston 90 and piston rod 91 from bottoming out or hitting the internal end wall of the cylinder 87 and thereby damaging the cylinder assembly 87.

The frame 30 includes a water hose assembly, not shown, for delivering water to the rotating scrubbing wheels 57 in the usual manner.

FIG. 1 illustrates typical dimensions in "inches" for spacing different size wrap around scrubbing wheels 25 and side wheel assemblies 29. Having described my invention, reference should now be had to the following claims:

I claim:

1. In a car washing apparatus for successively scrubbing the front, sides and rear of a vehicle body during movement of the vehicle along a predetermined path in a bay having a floor wherein a pair of spaced longitudinally staggered wrap around scrubbing wheels are mounted upon opposite sides of said path outwardly of said body, the improvement comprising;

a pair of spaced free standing longitudinally staggered side wheel assemblies for scrubbing, washing and polishing the sides, rocker panels and wheels, mounted upon opposite sides of said path and in longitudinal spaced relation with said wrap around scrubbing wheels respectively, operatively engaging along opposite sides of said body;

each side wheel assembly including an elongated base plate mounted upon the floor;

an upright side frame mounted upon said base plate including a top beam;

a first horizontal side wheel arm at one end pivotally mounted upon said top beam and extending forwardly at an acute angle toward said path;

a first bearing housing upon the other end of said arm;

a first hydraulic motor mounted upon said bearing housing having a depending first drive shaft journaled through said bearing housing;

a first scrubbing, washing and polishing wheel of fabric material axially mounted on said shaft for rotation upon a substantially vertical axis and adapted to operatively and successively engage the sides, rocker panels and wheels of said vehicle upon its opposite sides as a vehicle moves through said bay;

actuating means interposed between said side frame and said first horizontal side wheel arm and the connected first scrubbing wheel for moving said wheel arm and first wheel relative to said path and to said vehicle body;

a second horizontal side wheel arm spaced from and parallel to said first side wheel arm, at one end pivotally mounted upon said top beam;

a second bearing housing upon the other end of said second arm;

a second hydraulic motor mounted upon said second bearing housing having a depending second drive shaft journaled through said second bearing housing and rotatable in the direction opposite from said first drive shaft;

a second scrubbing, washing and polishing wheel of fabric material axially mounted on said second shaft for rotation upon a substantially vertical axis and adapted to operatively and successively engage the sides, rocker panels and wheels of said vehicle; and a tie bar at its ends pivotally connected to intermediate portions of said first and second side wheel arms for controlling pivotal movements of said second wheel arm upon movement of said first wheel arm by said actuating means.

2. In the car washing apparatus of claim 1, each base plate being laterally opposed to the corresponding staggered wrap around scrubbing wheel, the longitudinal staggering of said free standing scrubbing side wheel assemblies longitudinally compacting the working length of the total car washing apparatus.

3. In the car washing apparatus of claim 1, said means including a cylinder having a piston and a piston rod, with one end of said cylinder being pivotally connected to said side frame and said piston rod at its outer end being pivotally connected to said side wheel arm;

said cylinder being adapted to extend said side wheel arm and said connected first scrubbing wheel.

4. In the car washing apparatus of claim 3 wherein a cable has its opposite ends interposed between said frame and said piston rod exteriorly of said cylinder to limit the travel of said piston and piston rod and thereby prevent same from bottoming out in said cylinder and causing damage thereto.

5. In a car washing apparatus for successively scrubbing the front, sides and rear of a vehicle body during movement of the vehicle along a predetermined path in a bay having a floor wherein a pair of spaced longitudinally staggered wrap around scrubbing wheels are mounted upon opposite sides of said path outwardly of said body, the improvement comprising;

a pair of spaced free standing longitudinally staggered side wheel assemblies for scrubbing, washing and polishing the sides, rocker panels and wheels, mounted upon opposite sides of said path and in longitudinal spaced relation with said wrap around scrubbing wheels respectively, operatively engaging along opposite sides of said body;

each side wheel assembly including an elongated base plate mounted upon the floor;

an upright side frame mounted upon said base plate including a top beam;

a first horizontal side wheel arm at one end pivotally mounted upon said top beam and extending forwardly at an acute angle toward said path;

a first bearing housing upon the other end of said arm;

a first hydraulic motor mounted upon said bearing housing having a depending first drive shaft journaled through said bearing housing;

a first scrubbing, washing and polishing wheel of fabric material axially mounted on said shaft for rotation upon a substantially vertical axis and adapted to operatively and successively engage the sides, rocker panels and wheels of said vehicle upon its opposite sides as a vehicle moves through said bay;

means interposed between said side frame and said first horizontal side wheel arm and the connected first scrubbing wheel for moving said wheel arm and first wheel relative to said path and to said vehicle body;

said means including a cylinder having a piston and a piston rod, with one end of said cylinder being pivotally connected to said side frame and said piston rod at its outer end being pivotally connected to said side wheel arm;

said cylinder being adapted to extend said side wheel arm and said connected first scrubbing wheel;

a pneumatic-hydraulic circuit including a source of air under pressure;

first and second reservoirs containing oil;

first and second conduits interconnecting said first and second reservoirs with the rod end and cylinder end of said cylinder respectively;

third and fourth conduits interconnecting said source of air with said first and second reservoirs respectively to provide pressurized air over the oil in said reservoirs;

a pilot operated check valve in said first conduit between said first reservoir and the rod end of said cylinder;

a branch conduit connected to said air supply and to said check valve;

a normally open three-way valve interposed in said branch conduit for delivering air to said pilot operated check valve;

a first pressure regulator in said third conduit and a second pressure regulator in said fourth conduit;

said second regulator being set at a higher pressure setting than said first regulator whereby the difference in the pressure of air between said first and second reservoirs is effective to direct the oil from said second reservoir into said cylinder end of said cylinder and to thereby extend said piston rod resulting in said side wheel arm and connected first scrubbing wheel being extended toward said path;

said pilot operated check valve being held opened by the pressure of air in said branch conduit when said three-way valve is open and closing when the air under pressure is removed from the check valve upon the shifting of said three-way valve from its normally open position;

said extended side wheel arm and connected first scrubbing wheel, when said three-way valve and check valve are opened, when contacted by the vehicle body being effective to overcome the force exerted by said cylinder thereby moving said side wheel arm and connected first scrubbing wheel away from said path to compensate for vehicle bodies of different width;

said side wheel arm and connected first scrubbing wheel applying pressure to the side of the vehicle body as the body moves along said path;

said three-way valve being shifted once the vehicle body starts to exit from said side wheel arm and connected first scrubbing wheel thereby blocking flow of air therethrough thus releasing the air under pressure on said pilot operated check valve;

said check valve upon the removal of the air under pressure permitting oil to flow in one direction only from said first reservoir to said rod end of said cylinder whereby said side wheel arm and connected first scrubbing wheel being adapted to move away from said path and vehicle body if contacted by the vehicle body, said side wheel arm and connected first scrubbing wheel also being prevented from moving into a wheel well of the vehicle if contacted by the vehicle body;

said check valve when closed preventing the oil from exiting the rod end of said cylinder and when opened permitting oil said first said reservoir to enter the rod end of said cylinder;

said three-way valve after said vehicle body completely exits said scrubbing wheel being shifted to its normally open position resulting in air under pressure being directed to said pilot operated check valve, which unseats the checking mechanism therein and permits oil flow in both directions in said first conduit;

said side wheel arm and said connected first scrubbing wheel being extended towards the next vehicle body and said path as a result of the difference in pressure of air as determined by said regulators.

6. In the car washing apparatus of claim 5, and a flow control valve located in said first conduit intermediate said check valve and said cylinder, providing restricted flow of oil out of said cylinder so that extension of said first scrubbing wheel is at a reduced rate after the vehicle has passed said first scrubbing wheel.

7. In the car washing apparatus of claim 5, and electronic means to activate said normally open three-way valve.

8. In the car washing apparatus of claim 7, said electronic means including a remote controlled solenoid.

9. In a car washing apparatus for successively scrubbing the opposite sides of a vehicle body during movement along a predetermined path in a bay having a floor;

a pair of free standing longitudinally staggered side wheel assemblies for scrubbing, washing and polishing the sides, rocker panels and wheels, mounted upon opposite sides of said path operatively engaging along opposite sides of said body;

each side wheel assembly including an elongated base plate mounted upon the floor;

an upright side frame mounted upon said base plate including a top beam;

a first horizontal side wheel arm at one end pivotally mounted upon said top beam and extending forwardly at an acute angle toward said path;

a first bearing housing upon the other end of said arm;

a first hydraulic motor mounted upon said bearing housing having a depending first drive shaft journaled through said bearing housing;

a first scrubbing, washing and polishing wheel of fabric material axially mounted on said shaft for rotation upon a substantially vertical axis and adapted to operatively and successively engage the sides, rocker panels and wheels of said vehicle upon its opposite sides as it moves through said bay;

actuating means interposed between said side frame and said first horizontal side wheel arm and the connected first scrubbing wheel for moving said wheel arm and first wheel relative to said path and to said vehicle body;

a second horizontal side wheel arm spaced from and parallel to said first side wheel arm, at one end pivotally mounted upon said top beam;

a second bearing housing upon the other end of said second arm;

a second hydraulic motor mounted upon said second bearing housing having a depending second drive shaft journaled through said second bearing housing and rotatable in the direction opposite from said first drive shaft;

a second scrubbing, washing and polishing wheel of fabric material axially mounted on said second shaft for rotation upon a substantially vertical axis and adapted to operatively and successively engage the sides, rocker panels and wheels of said vehicle; and a tie bar at its end pivotally connected to intermediate portions of said first and second side wheel arms for controlling pivotal movements of said second wheel arm upon movement of said first wheel arm by said actuating means.

10. In the car washing apparatus of claim 9, said means including a cylinder having a piston and a piston rod, with one end of said cylinder being pivotally connected to said side frame and said piston rod at its outer end being pivotally connected to said side wheel arm;

said cylinder being adapted to extend said side wheel arm and said connected first scrubbing wheel.

11. In the car washing apparatus of claim 10 wherein a cable has its opposite ends interposed between said frame and said piston rod exteriorly of said cylinder to limit the travel of said piston and piston rod and thereby prevent same from bottoming out in said cylinder and causing damage thereto.

12. In a car washing apparatus for successively scrubbing the opposite sides of a vehicle body during movement along a predetermined path in a bay having a floor;

a pair of free standing longitudinally staggered side wheel assemblies for scrubbing, washing and polishing the sides, rocker panels and wheels, mounted upon opposite sides of said path operatively engaging along opposite sides of said body;

each side wheel assembly including an elongated base plate mounted upon the floor;

an upright side frame mounted upon said base plate including a top beam;

a first horizontal side wheel arm at one end pivotally mounted upon said top beam and extending forwardly at an acute angle toward said path;

a first bearing housing upon the other end of said arm;

a first hydraulic motor mounted upon said bearing housing having a depending first drive shaft journaled through said bearing housing;

a first scrubbing, washing and polishing wheel of fabric material axially mounted on said shaft for rotation upon a substantially vertical axis and adapted to operatively and successively engage the sides, rocker panels and wheels of said vehicle upon its opposite sides as it moves through said bay;

means interposed between said side frame and said first horizontal side wheel arm and the connected first scrubbing wheel for moving said wheel arm and first wheel relative to said path and to said vehicle body;

said means including a cylinder having a piston and a piston rod, with one end of said cylinder being pivotally connected to said side frame and said piston rod at its outer end being pivotally connected to said side wheel arm;

said cylinder being adapted to extend said side wheel arm and said connected first scrubbing wheel;

a pneumatic-hydraulic circuit including a source of pressurized air;

first and second reservoirs containing oil;

first and second conduits interconnecting said first and second reservoirs with the rod end and cylinder end of said cylinder respectively;

third and fourth conduits interconnecting said source of air with said first and second reservoirs respectively to provide pressurized air over the oil in said reservoirs;

a pilot operated check valve in said first conduit between said first reservoir and the rod end of said cylinder;

a branch conduit connected to said air supply and to said check valve;

a normally open three-way valve interposed in said branch conduit for delivering air to said pilot operated check valve;

a first pressure regulator in said third conduit and a second pressure regulator in said fourth conduit;

said second regulator being set at a higher pressure setting than said first regulator whereby the difference in the pressure of air between said first and second reservoirs is effective to direct the oil from said second reservoir into said cylinder end of said cylinder and to thereby extend said piston rod resulting in said side wheel arm and connected first scrubbing wheel being extended toward said path;

said pilot operated check valve being held opened by the pressure of air in said branch conduit when said three-way valve is open and closing when the air under pressure is removed from the check valve upon the shifting of said three-way valve from its normally open position;

said extended side wheel arm and connected first scrubbing wheel, when said three-way valve and check valve are opened, when contacted by the vehicle body being effective to overcome the force exerted by said cylinder thereby moving said side wheel arm and connected first scrubbing wheel away from said path to compensate for vehicle bodies of different width;

said side wheel arm and connected first scrubbing wheel applying pressure to the side of the vehicle body as the body moves along said path;

said three-way valve being shifted once the vehicle body starts to exit from said side wheel arm and connected first scrubbing wheel thereby blocking flow of air therethrough thus releasing the air under pressure on said pilot operated check valve;

said check valve upon the removal of the air under pressure permitting oil to flow in one direction only from said first reservoir to said rod end of said cylinder whereby said side wheel arm and connected first scrubbing wheel being adapted to move away from said path and vehicle body if contacted by the vehicle body, said side wheel arm and connected first scrubbing wheel also being prevented from moving into a wheel well of the vehicle if contacted by the vehicle body;

said check valve when closed preventing the oil from exiting the rod end of said cylinder and when opened permitting oil from said first reservoir to enter the rod end of said cylinder;

said three-way valve after said vehicle body completely exits said scrubbing wheel being shifted to its normally open position resulting in air under pressure being directed to said pilot operated check valve, which unseats the checking mechanism therein and permits oil flow in both directions in said first conduit;

said side wheel arm and said connected first scrubbing wheel being extended towards the next vehicle body and said path as a result of the difference in pressure of air as determined by said regulators.

13. In the car washing apparatus of claim 12, and a flow control valve located in said first conduit intermediate said check valve and said cylinder, providing restricted flow of oil out of said cylinder so that extension of said first scrubbing wheel is at a reduced rate after the vehicle has passed said first scrubbing wheel.

14. A free standing side wheel assembly for scrubbing, washing and polishing the sides, rocker panels and wheels of a vehicle;

said side wheel assembly including an elongated base plate mounted upon the floor;

an upright side frame mounted upon said base plate including a top beam;

a first horizontal side wheel arm at one end pivotally mounted upon said top beam and extending forwardly at an acute angle toward said path;

a first bearing housing upon the other end of said arm;

a first hydraulic motor mounted upon said bearing housing having a depending first drive shaft journaled through said bearing housing;

a first scrubbing, washing and polishing wheel of fabric material axially mounted on said shaft for rotation upon a substantially vertical axis and adapted to operatively and successively engage the sides, rocker panels and wheel of said vehicle;

means interposed between said side frame and said first horizontal side wheel arm and the connected scrubbing wheel for moving said wheel arm and wheel relative to said path and to said vehicle body;

said means including a cylinder having a piston and a piston rod, with one end of said cylinder being pivotally connected to said side frame and said piston rod at its outer end being pivotally connected to said side wheel arm;

said cylinder being adapted to extend said side wheel arm and said connected first scrubbing wheel;

a pneumatic-hydraulic circuit including a source of air under pressure;

first and second reservoirs containing oil;

first and second conduits interconnecting said first and second reservoirs with the rod end and cylinder end of said cylinder respectively;

third and forth conduits interconnecting said source of air with said first and second reservoirs respectively to provide pressurized air over the oil in said reservoirs;

a pilot operated check valve in said first conduit between said first reservoir and the rod end of said cylinder;

a branch conduit connected to said air supply and to said check valve;

a normally open three-way valve interposed in said branch conduit for delivering air to said pilot operated check valve;

a first pressure regulator in said third conduit and a second pressure regulator in said fourth conduit;

said second regulator being set at a higher pressure setting than said first regulator whereby the difference in the pressure of air between said first and second reservoirs is effective to direct the oil from said second reservoir into said cylinder end of said cylinder and to thereby extend said piston rod resulting in said side wheel arm and connected first scrubbing wheel being extended toward said path;

said pilot operated check valve being held opened by the pressure of air in said branch conduit when said three-way valve is open and closing when the air under pressure is removed from the check valve upon the shifting of said three-way valve from its normally open position;

said extended side wheel arm and connected first scrubbing wheel, when said three-way valve and check valve are opened, when contacted by the vehicle body being effective to overcome the force exerted by said cylinder thereby moving said side wheel arm and connected first scrubbing wheel away from said path to compensate for vehicle bodies of different width;

said side wheel arm and connected first scrubbing wheel applying pressure to the side of the vehicle body as the body moves along said path;

said three-way valve being shifted once the vehicle body starts to exit from said side wheel arm and connected first scrubbing wheel thereby blocking flow of air therethrough thus releasing the air under pressure on said pilot operated check valve;

said check valve upon the removal of the air under pressure permitting oil to flow in one direction only from said first reservoir to said rod end of said cylinder whereby said side wheel arm and connected first scrubbing wheel being adapted to move away from said path and vehicle body if contacted by the vehicle body, said side wheel arm and connected first scrubbing wheel also being prevented from moving into a wheel well of the vehicle if contacted by the vehicle body;

said check valve when closed preventing the oil from exiting the rod end of said cylinder and when opened permitting oil from said first reservoir to enter the rod end of said cylinder;

said three-way valve after said vehicle body completely exits said scrubbing wheel being shifted to its normally open position resulting in air under pressure being directed to said pilot operated check valve, which unseats the checking mechanism therein and permits oil flow in both directions in said first conduit;

said side wheel arm and said connected first scrubbing wheel being extended towards the next vehicle body and said path as a result of the difference in pressure of air as determined by said regulators.

15. The free standing side wheel assembly as defined in claim 14, and a flow control valve located in said first conduit intermediate said check valve and said cylinder, providing restricted flow of oil out of said cylinder so that extension of said first scrubbing wheel is at a reduced rate after the vehicle has passed said first scrubbing wheel.

16. The free standing side wheel assembly as defined in claim 14 wherein a cable has its opposite ends interposed between said frame and said piston rod exteriorly of said cylinder to limit the travel of said piston and piston rod and thereby prevent same from bottoming out in said cylinder and causing damage thereto.

* * * * *